United States Patent
Spinali

[19]

[11] Patent Number: 6,118,599
[45] Date of Patent: Sep. 12, 2000

[54] HYBRID OPTICAL BARREL

[75] Inventor: Marc Spinali, San Ramon, Calif.

[73] Assignee: Nikon Corporation, Tokyo, Japan

[21] Appl. No.: 09/184,651

[22] Filed: Nov. 3, 1998

[51] Int. Cl.[7] .................................................. G02B 7/02
[52] U.S. Cl. ......................... 359/820; 359/819; 359/826
[58] Field of Search .................................. 359/819, 820, 359/821, 822, 823, 826; 257/676, 667

[56] References Cited

U.S. PATENT DOCUMENTS

| | | | |
|---|---|---|---|
| 4,147,413 | 4/1979 | Sims et al. ............................. | 350/253 |
| 4,162,120 | 7/1979 | Moreno ................................. | 350/253 |
| 5,150,376 | 9/1992 | Ohmori et al. ........................ | 372/107 |
| 5,216,730 | 6/1993 | Demeritt et al. ...................... | 385/33 |
| 5,265,143 | 11/1993 | Early et al. ............................ | 378/84 |
| 5,315,609 | 5/1994 | Tanaka et al. ......................... | 372/43 |
| 5,376,983 | 12/1994 | Yamazaki et al. ................. | 354/195.12 |
| 5,570,238 | 10/1996 | Leary .................................... | 359/820 |
| 5,982,028 | 11/1999 | Pape et al. ............................ | 257/676 |

FOREIGN PATENT DOCUMENTS

| | | |
|---|---|---|
| 61-159609 | 7/1986 | Japan . |
| 61-160710 | 7/1986 | Japan . |

OTHER PUBLICATIONS

INSPEC Abstract No.: A90052888, Ahmad, A., "High Resonance Adjustable Mirror Mounts," 1989, Proceedings of the SPIE—The International Society for Optical Engineering, vol. 1167, pp. 313–17.

"Telescope Assembly WBS," printed from http://ack.arc.nasa.gov/ic/projects/said/ta_wbs.html on Dec. 22, 1997, pp. 1–5.

"Hot Technologies in Microjoining," printed from wysiwyg://137/http://ewi.ewi.org/ewi/micro/hot.html on Dec. 22, 1997, pp. 1–2.

"ULE, Zero Expansion Glass," printed from http://www.besoptics.com/html/corning_ule.html on Dec. 22, 1997, pp. 1–2.

Questar Telescopes Index Page, Company Seven, Maryland, printed from http://www.company7.com/questar/quest1.html on Dec. 23, 1997, pp. 1–3.

Derwent WPI Acc. No.: 93–020292/199303, English Abstract for FR 2676549 A. (Nov. 20, 1992).

Derwent WPI Acc. No.: 88–120843/198818, English Abstract for EP 265648 A, and English Abstract for EP 265648 B. (Mar. 27, 1991).

JAPIO No.: 02693009, English Abstract for JP 63309909 A. (Dec. 19, 1988).

JAPIO No.: 02312314, English Abstract for JP 62229214 A. (Oct. 8, 1987).

Derwent WPI Acc. No.: 91–335316/199146, English Abstract for JP 3223727 A, and English Abstract for US 5150376 A. (Sep. 22, 1991) (Oct. 2, 1991).

*Primary Examiner*—Loha Ben
*Attorney, Agent, or Firm*—Finnegan, Henderson, Farabow, Garrett & Dunner, L.L.P.

[57] ABSTRACT

A hybrid optical barrel as a projection optical unit includes a plurality of cell groups disposed in series along an optical axis, each cell group including at least a cell unit and each cell unit including a lens and a cell holding the lens. The optical barrel also includes a connecting barrel member carrying the plurality of cell groups, the connecting barrel member being made of a material with a CTE<3.0 ppm°C. such as Invar, Ultra Low Expansion™ glass, Zerodur glass, or silicon carbide. The connecting barrel member may comprise a plurality of sub-barrels disposed in series along the optical axis. Alternatively, the connecting barrel member may comprise a plurality of spacing members. Therefore, during an axial displacement of the optical barrel caused by a temperature change, relative axial dimensions of the sub-barrels or the spacing members remain substantially constant, thereby reducing an overall displacement of the lenses within the plurality of cell groups.

46 Claims, 7 Drawing Sheets

FIG. 10

HYBRID OPTICAL BARREL

BACKGROUND OF THE INVENTION

1. Field of the Invention

This invention relates to an optical barrel designed as an optical projection unit, such as a projection unit for a projection exposure apparatus used in a semi-conductor wafer production. More particularly, the present invention relates to a hybrid optical barrel having a sub-barrel and cells being made of different materials.

2. Description of the Related Art

An optical barrel is a tubular mechanical structure including a sturdy threaded body and durable metal retaining rings, often referred to as lock rings, to retain a series of lens holders, commonly referred to as cells. A lens is to be mounted in a cell. This optical barrel design applies in many optical systems. For example, the optical barrel may be used for attachment to an optical projection unit as a part of a projection exposure apparatus used in production of semiconductor wafers. See, for example, U.S. Pat. No. 5,528,118 to Lee entitled "Guideless Stage With Isolated Reaction Stage."

The projection exposure apparatus reduces a pattern on a template, such as a reticle or a mask, through the optical projection unit and sequentially transfers the pattern onto a predetermined area on a semiconductor wafer or plate, which is a photo-sensitive substrate for making computer chips, such as microprocessor or memory chips. A focus depth of the optical projection unit becomes very small as the miniaturization of a circuit pattern progresses. Therefore, a primary consideration for this type of optical barrel structure includes designing an optical barrel capable of having high tolerances for holding the barrel components for both stability and accuracy. In addition, the optical barrel preferably transfers a pattern that can be focused on the photosensitive substrate over a wide temperature range. However, coefficients of thermal expansion of barrel components, as well as indices of refraction of all lens materials, vary with temperature which collectively alter the focusing and distortion properties of the optical system. Many have developed optical designs and manufacturing processes to minimize this effect, but a common problem of the applications has originated from this temperature dependence.

Two conventional optical barrel structures are currently available in the market. One structure involves a barrel carrying a plurality of cells (also known as "lens holders") on which lenses are mounted. The cells slidably fit inside the barrel. This structure is commonly referred to as the conventional barrel type. Another structure involves a barrel comprising a series of sub-barrels connected end to end by fasteners to construct the barrel itself. This structure is referred to as the sub-barrel type. In both types of the conventional optical barrels, the barrel and the sub-barrels are commonly made of brass because brass is relatively inexpensive and easy to machine to achieve components with high tolerances. However, one of the disadvantages of brass barrel constructions is that they are not very stiff and are easily affected by temperature changes.

In light of the foregoing, there is a need for a stiffer optical barrel structure that can withstand temperature changes and remain dimensionally stable over a wide temperature range.

SUMMARY OF THE INVENTION

The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a hybrid optical barrel for attachment to an optical projection unit, a method of making the hybrid optical barrel and a method of using the hybrid optical barrel. The optical barrel comprises a plurality of cell groups disposed in series along an optical axis. Each cell group includes at least one cell unit and each cell unit includes a lens and a cell holding the lens. The optical barrel further comprises a connecting barrel member carrying the plurality of cell groups. The connecting barrel member is made of a material having a coefficient of expansion <3.0 ppm°C. Examples of such a material include Ultra Low Expansion™ glass, Zerodur glass, silicon carbide, or alternatively, Invar.

It is to be understood that both the foregoing general description and the following detailed description are exemplary and explanatory only and are not restrictive of the invention as claimed.

Additional advantages will be set forth in the description which follows, and in part will be understood from the description, or may be learned by practice of the invention. The objects and advantages may be obtained by means of the combinations set forth in the attached claims.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts. The invention will be further clarified by the following examples, which are intended to be exemplary of the invention.

In accordance with the invention, a hybrid optical barrel is provided with a plurality of cell groups disposed in series along an optical axis. Each cell group includes at least a cell unit and each cell unit further includes a lens and a cell holding the lens.

Figure 1:
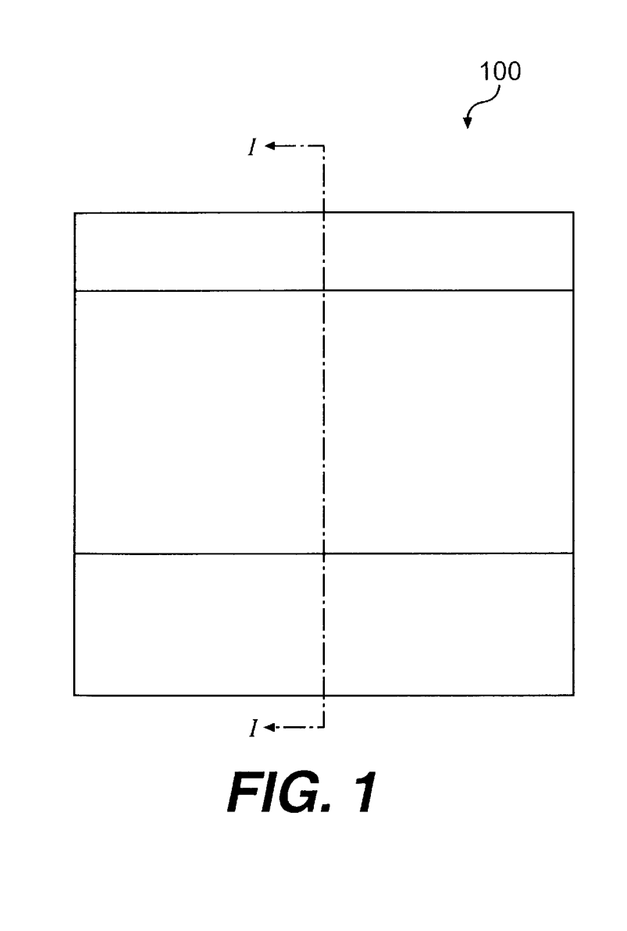
FIG. 1 is a front view of a hybrid optical barrel illustrating a sub-barrel type according to a first embodiment of the present invention.
Figure 2:
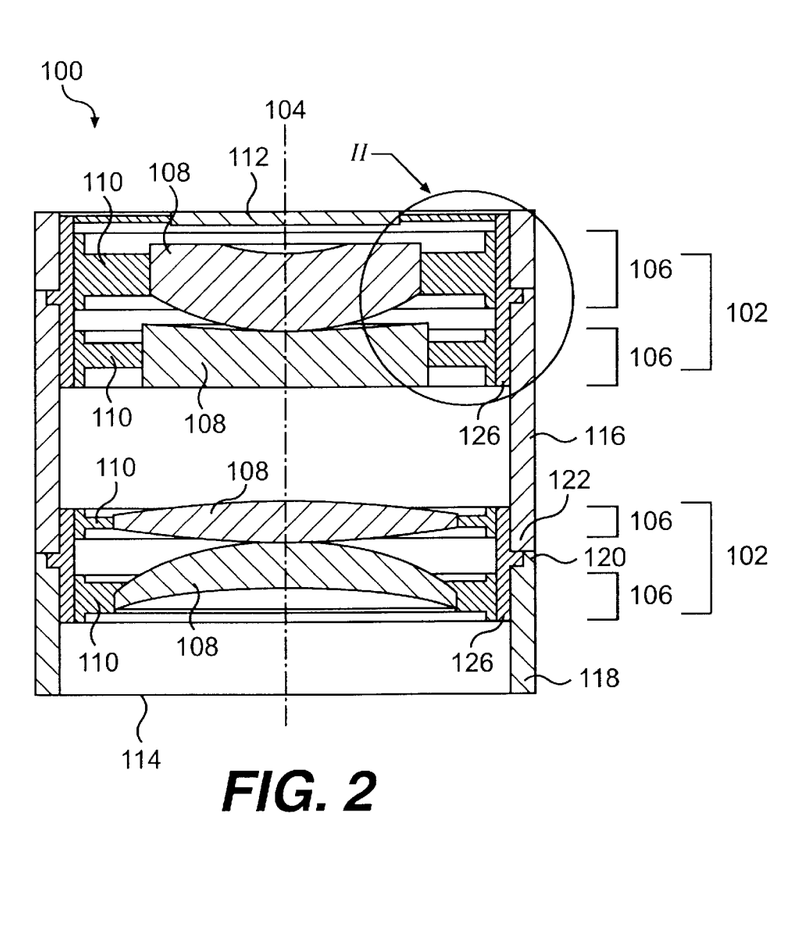
FIG. 2 is a cross-sectional view of a hybrid optical barrel of the present invention taken along line I—I of FIG. 1.
Figure 6:
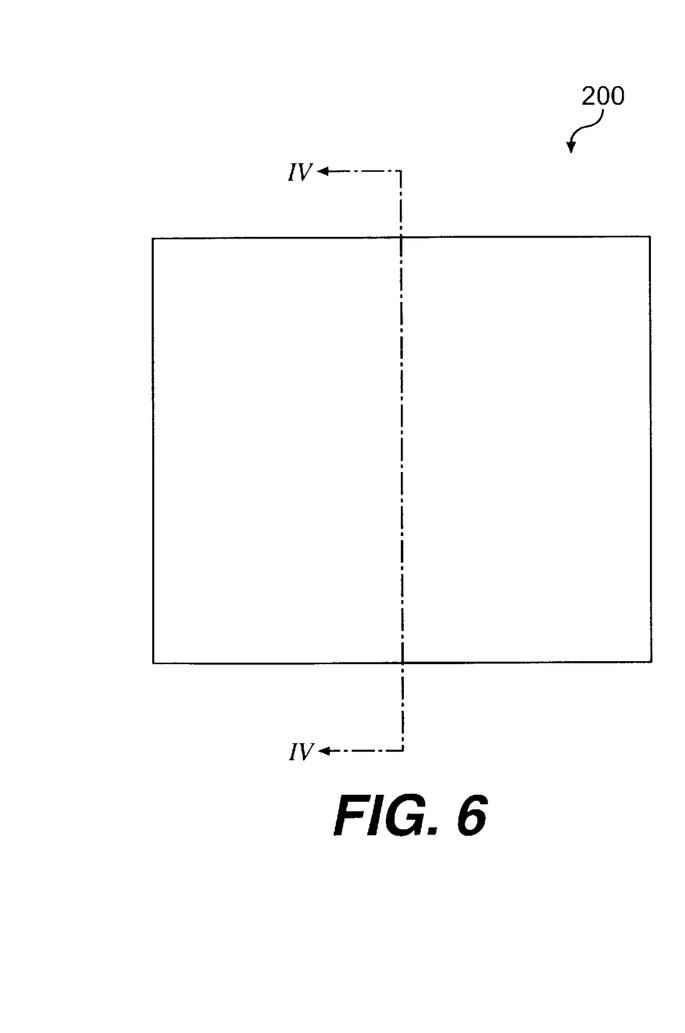
FIG. 6 is a front view of a hybrid optical barrel illustrating a barrel construction type according to a second embodiment of the present invention.

In an embodiment and as illustrated in FIG. 1, a hybrid optical barrel, designated by the reference numeral 100, is shown to be a sub-barrel type. In another embodiment and as illustrated in FIG. 6, a hybrid optical barrel, designated by the reference numeral 200, is shown to be a barrel type. As shown in FIG. 2, sub-barrel type hybrid optical barrel 100 is shown to include a plurality of cell groups 102 disposed in series along an optical axis 104. Each cell group 102 includes at least one cell unit 106 and each cell unit 106 further includes a lens 108 and a cell 110 holding lens 108. Hybrid optical barrel 100 is also shown to include an opening lens 112 and a focal plane opening 114.

Figure 7:
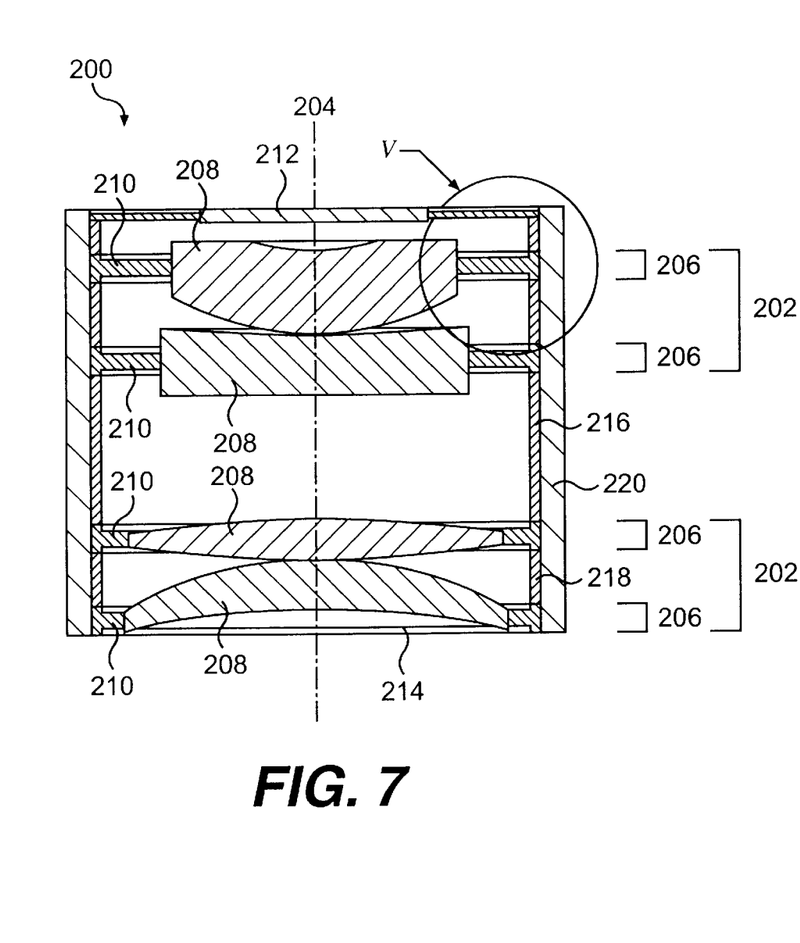
FIG. 7 is a cross-sectional view of a hybrid optical barrel of the present invention taken along line IV—IV of FIG. 6.

Similarly, as shown in FIG. 7, barrel type hybrid optical barrel 200 includes a plurality of cell groups 202 disposed in series along an optical axis 204. Each cell group 202 includes at least one cell unit 206 and each cell unit 206 further includes a lens 208 and a cell 210 holding lens 208. Hybrid optical barrel 200 is shown to include an opening lens 212 and a focal plane opening 214.

In a projection exposure apparatus for semiconductor production, hybrid optical barrel, 100 or 200, may be the optical projection unit whereby a template, such as a reticle or a mask, is positioned in front of opening lens, 112 or 212, respectively, and a photo-sensitive substrate is positioned in front of focal plane opening, 114 or 214, respectively. The projection exposure apparatus reduces a pattern on the template, such as a reticle or the mask, through the optical projection unit and sequentially transfers the pattern onto a predetermined area on a semiconductor wafer or plate which is a photo-sensitive substrate for making computer chips.

Lenses 108 and 208 may be of different types and may have varying diametrical sizes. Lenses, 108 and 208, within each cell groups, 102 and 202, respectively, are preferably separated by a sufficient axial distance to accommodate optical barrel contraction due to an extremely low temperature change. Therefore, even at an extreme low temperature, each lens, 108 or 208, within a cell group, 102 or 202, respectively, will not compress the other adjacent lens, 108 or 208, respectively, and avoid lens fracture. Each of cell groups, 102 and 202, respectively, is shown to comprise a pair of cell units, 106 and 206, respectively. Alternatively, cell groups, 102 and 202, may also comprise less or more than a pair of cell units, 106 and 206, respectively. Cells, 110 and 210, are preferably made of brass or stainless steel. Stainless steel cells, 110 and 210, will provide stronger construction than the brass cell, although it is relatively more difficult to machine stainless steel parts for holding high tolerances as required for this application.

Also in accordance with the invention, a hybrid optical barrel is provided with a connecting barrel member being made of a material with a CTE<3.0 ppm/°C., for example, Ultra Low Expansion™ glass, Zerodur glass, silicon carbide, or alternatively, Invar.

In the preferred embodiments and as illustrated in FIGS. 2 and 7, hybrid optical barrels, 100 and 200, respectively, are shown to include connecting barrel members, 116 and 216, respectively, carrying the plurality of cell groups, 102 and 202, respectively. Connecting barrel members, 116 and 216, are preferably made of a material having a characteristic of low coefficient of thermal expansion, for example, Ultra Low Expansion™ glass, Zerodur glass, silicon carbide, or alternatively, Invar.

Ultra Low Expansion™ glass (ULE), such as fused silica, is a synthetic amorphous silicon dioxide ($SiO_2$) that is produced using either a flame or a vapor phase hydrolysis of silicon halide. The hydrolysis results in an amorphous optical material of extremely high purity, and is one of the most transparent optical materials made. This noncrystalline, colorless, silica glass combines a very low thermal expansion coefficient of approximately 0.03 ppm/K at temperatures between 5° and 35° C. with excellent optical qualities and exceptional transmittance in the ultraviolet. Fused silica is available in various grades for different applications some of which include high energy laser optics.

Alternatively, connecting barrel members, 116 and 216, may be made of Zerodur glass. Zerodur commonly applies in laser technology where it's used for mirror substrates in microlithography and other important optical components. It is an inorganic, non porous material which has a crystalline phase and a glassy phase, and is produced by using methods common in glass technology including melting suitable raw materials, refining, homogenizing, and then hot forming. After the cooling and annealing of the glassy blank, a temperature treatment follows in which the glass is transformed into a glass ceramic through controlled volume crystallization. During this temperature treatment, nuclei form within the glass, and the crystals subsequently grow at a somewhat higher temperature. The crystalline phase and the glass phase together lend the material its special properties. The material contains 70–78 weight percent crystalline phase with a high quartz structure. The special composition of the base glass for the glass ceramic, a defined nucleation, and crystallization conditions result in a material with extremely low thermal expansion of approximately 0.05 ppm/K which in certain temperature ranges can even be zero or slightly negative, depending on the ceramization program.

Another alternative, connecting barrel members, 116 and 216, may be made of silicon carbide. Silicon carbide is a high temperature material with a sublimation temperature of about 2700° C. In an inert environment this material can be conveniently used up to a temperature of 2000° C. Above this temperature, there is an onset of phase change from cubic phase to hexagonal alpha phase. As shown in the table below, the material can be safely used up to a temperature of 1500° C. in air with a good retention of thermal and mechanical properties.

| DEGREES (° C.) | −140 | −100 | 0 | 200 | 500 | 700 | 1000 | 1200 |
|---|---|---|---|---|---|---|---|---|
| Coefficient of Thermal Expansion (ppm/K) | 0.4 | .08 | 1.9 | 3.7 | 4.6 | 4.9 | 5.0 | 5.1 |
| Specific Heat (J/Kg-K) | 175 | 301 | 574 | 952 | 1134 | 1189 | 1251 | 1295 |
| Thermal Conductivity (W/m-K) | 396 | 485 | 333 | 221 | 137 | 110 | 78 | 63 |
| Elastic Mod- | — | — | 460 | 457 | 450 | 440 | 435 | 422 |

-continued

| DEGREES (° C.) | -140 | -100 | 0 | 200 | 500 | 700 | 1000 | 1200 |
|---|---|---|---|---|---|---|---|---|
| ulus (Gpa) | | | | | | | | |
| Flexural Strength (Mpa) | 460 | 465 | 470 | 480 | 500 | 515 | 540 | 555 |

In accordance with the invention, the connecting barrel member comprises a plurality of sub-barrels disposed in series along the optical axis. Each sub-barrel has a connection end and a receiving end, whereby the connection end is provided for connection with the receiving end of another consecutive sub-barrel.

Figure 3:
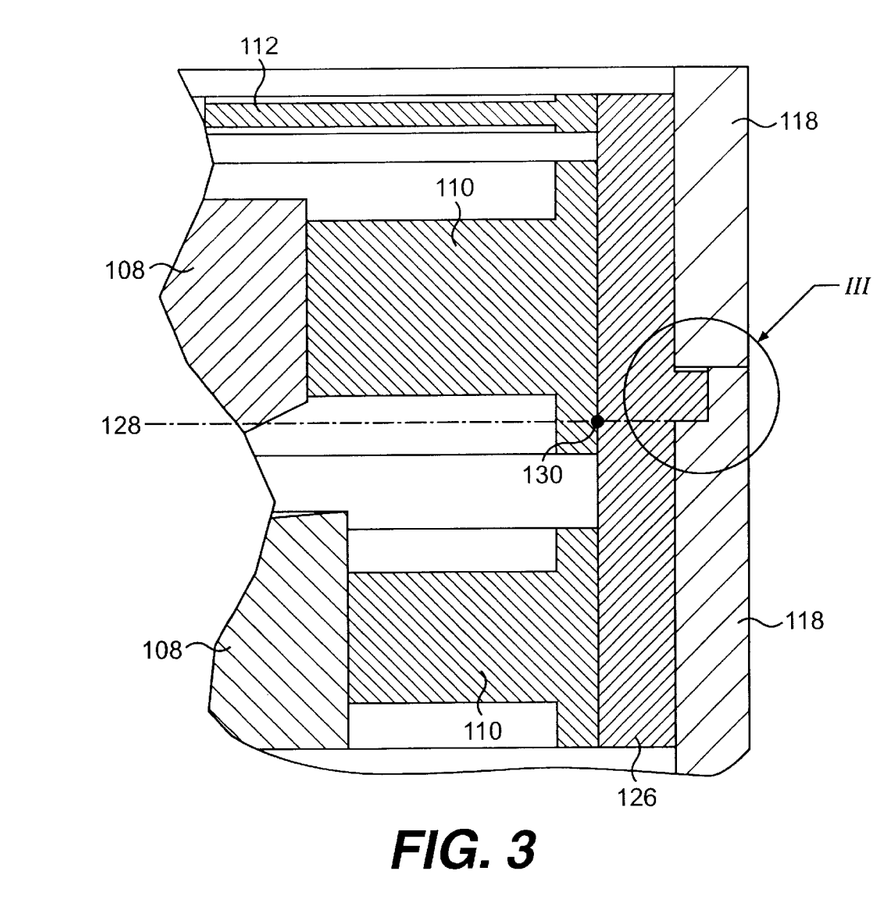
FIG. 3 is a detail view of a hybrid optical barrel of the present invention taken from portion II of FIG. 2.
Figure 4:
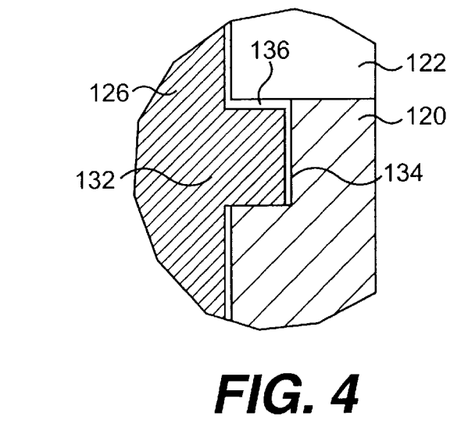
FIG. 4 is a detail view of a hybrid optical barrel of the present invention taken from portion III of FIG. 3.
Figure 5:
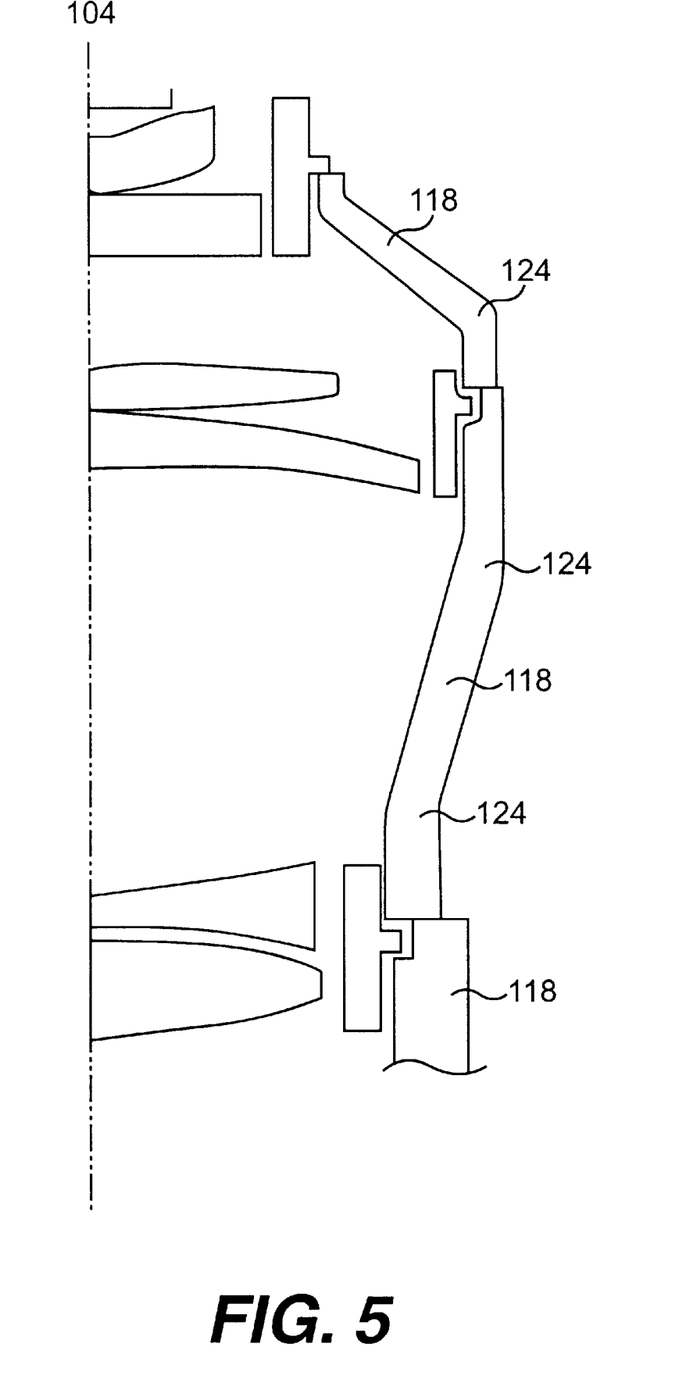
FIG. 5 is a partial cross-sectional view of a hybrid optical barrel illustrating an alternative sub-barrel structure including bent portions according to a first embodiment of the present invention.

FIGS. 1–5 illustrate a sub-barrel type of the optical barrel 100 according to a first embodiment of the present invention. Connecting barrel member 116 further comprises a plurality of sub-barrels 118 connected in series along optical axis 104. Each sub-barrel 118 has a connection end 120 and a receiving end 122. Connection end 120 of one sub-barrel 118 is provided for connection with receiving end 122 of another consecutive sub-barrel 118 in the series. Sub-barrels 118 may shape like a straight cylindrical body, as shown in FIGS. 1 and 2, with cells 110 making up for the diametrical differences of lenses 108. Alternatively, sub-barrels 118 may have bent portions 124, as shown in FIG. 5, to accommodate various sizes of lenses 108.

In accordance with the invention, each of the plurality of cell groups is further provided with a sub-cell for connecting the cell group to the connecting barrel member. Each of the sub-cell has a reference plane perpendicular to the optical axis and traversing an axial geometrical center of the sub-cell.

In FIG. 2, each cell group 102 is shown to include a sub-cell 126 for connecting cell group 102 to sub-barrel 118. Sub-cells 126 may be made of brass or stainless steel. Stainless steel will provide stronger construction although it is relatively more difficult to machine the stainless steel sub-cells 126 for holding high tolerances as required for this application. Each sub-cell 126 has a reference plane 128, as best shown in FIG. 3, perpendicular to optical axis 104 and traversing an axial geometrical center 130 of the sub-cell 126.

As illustrated in FIG. 4, the plurality of sub-barrels 118 are preferably made of a material selected from ULE, Zerodur, or alternatively, silicon carbide and are connected directly end to end with no intermediary metal pieces between sub-barrels 118. Each sub-cell 126 also preferably includes a circumferential tongue 132 abutting reference plane 128 to be inserted into a circumferential groove 134 near either one of the connection end 120 or the receiving end 122 of sub-barrel 118. An interference space 136 is provided around circumferential groove 134 to be able to accommodate circumferential tongue 132 at its fully expanded stage.

Therefore, during an axial displacement of the optical barrel 100 caused by a temperature increase or decrease, sub-barrels 118, due to their low coefficients of thermal expansion, experience a very minimal axial expansion or contraction. Sub-barrels 118 remain almost stationary. Thus, a relative axial position of reference plane 128 of sub-cell 126 remains substantially constant, while sub-cell 126 expands or contracts. Lenses 108 within a cell group 102 held by sub-cell 126 move axially according to the rate of thermal expansion of sub-cell 126. Since reference plane 128 traverses axial center 130 of sub-cell 126, cell 110 and the corresponding lens 108 above reference plane 128 will move axially upward, while cell 110 and the corresponding lens 108 below reference plane 128 will move axially downward. Thereby, an overall displacement of lenses 108 within the plurality of cell groups 102 is minimized.

Further in accordance with the invention, a hybrid optical barrel may be provided with a barrel disposed along the optical axis within which the connecting barrel member and the plurality of cell groups are slidably arranged.

Figure 8:
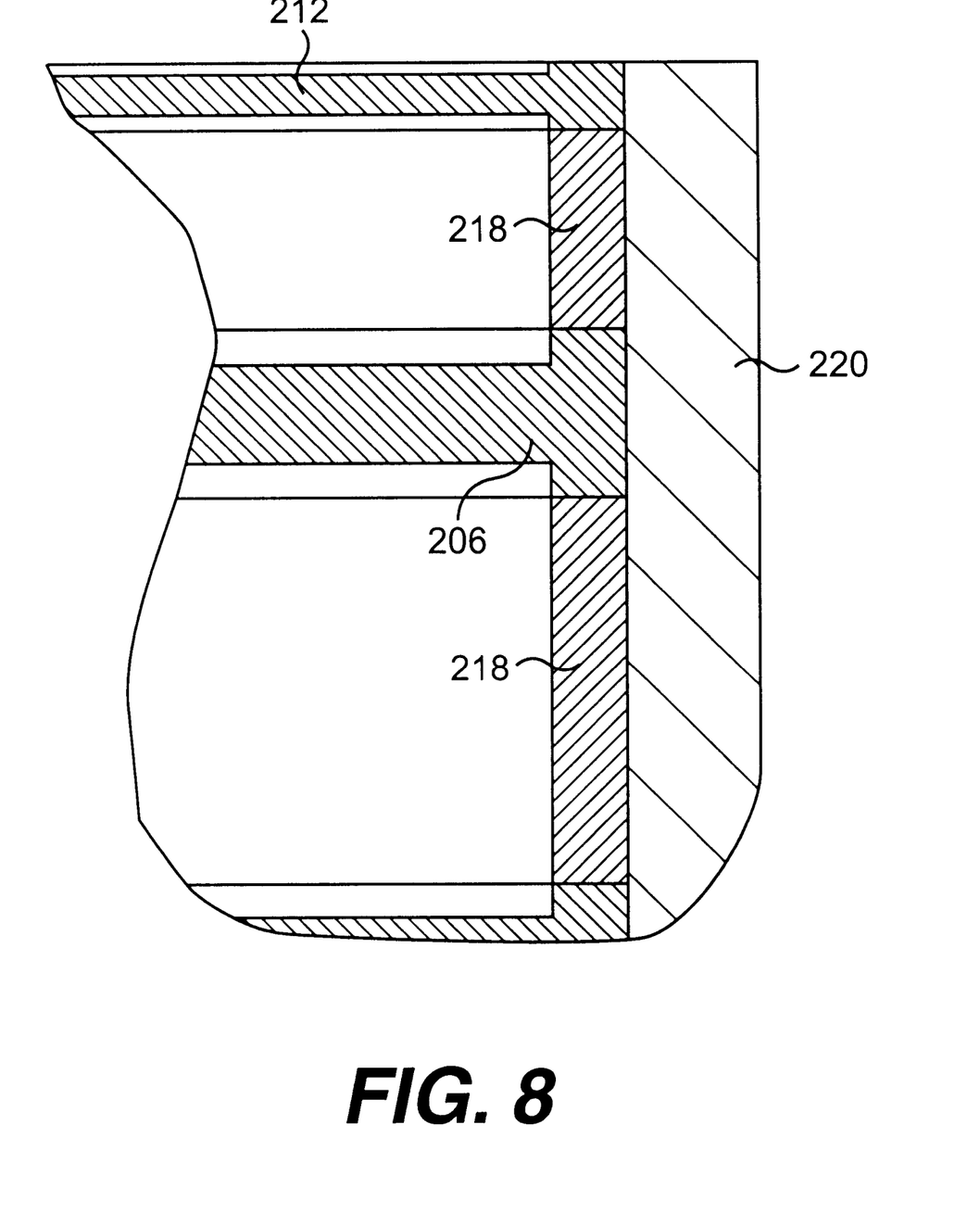
FIG. 8 is a detail view of a hybrid optical barrel of the present invention taken from portion V of FIG. 7.

FIGS. 6–8 illustrate a barrel type of the optical barrel according to a second embodiment of the present invention. Connecting barrel member 216 further comprises a plurality of spacing members 218 disposed in series along optical axis 204. Each spacing member 218 is disposed alternately with a cell unit 206. The alternating construction of spacing members 218 and cell units 206 are then inserted into a barrel 220. Spacing members 218 are preferably made of a material having a characteristic of low coefficient of thermal expansion (<3.0 ppm/K) such as ULE, Zerodur, or alternatively, silicon carbide. Barrel 220 is preferably made of either brass or stainless steel. Barrel 220 commonly shapes like a straight cylindrical body, as shown in FIGS. 6 and 7, with cells 210 making up for the diametrical differences of lenses 208.

Therefore, during an axial displacement of the optical barrel 200 caused by a temperature change, either increasing or decreasing, barrel 220 will expand or contract, respectively. Cells 210 will also move axially according to their rates of thermal expansion and slidably displace spacing members 218. However, spacing members 218, due to their low coefficients of thermal expansion, experience a very minimal axial expansion or contraction. Spacing members 218 substantially maintain their axial dimension. Thereby, an overall displacement of lenses 208 within the plurality of cell groups 202 is minimized.

Figure 9:
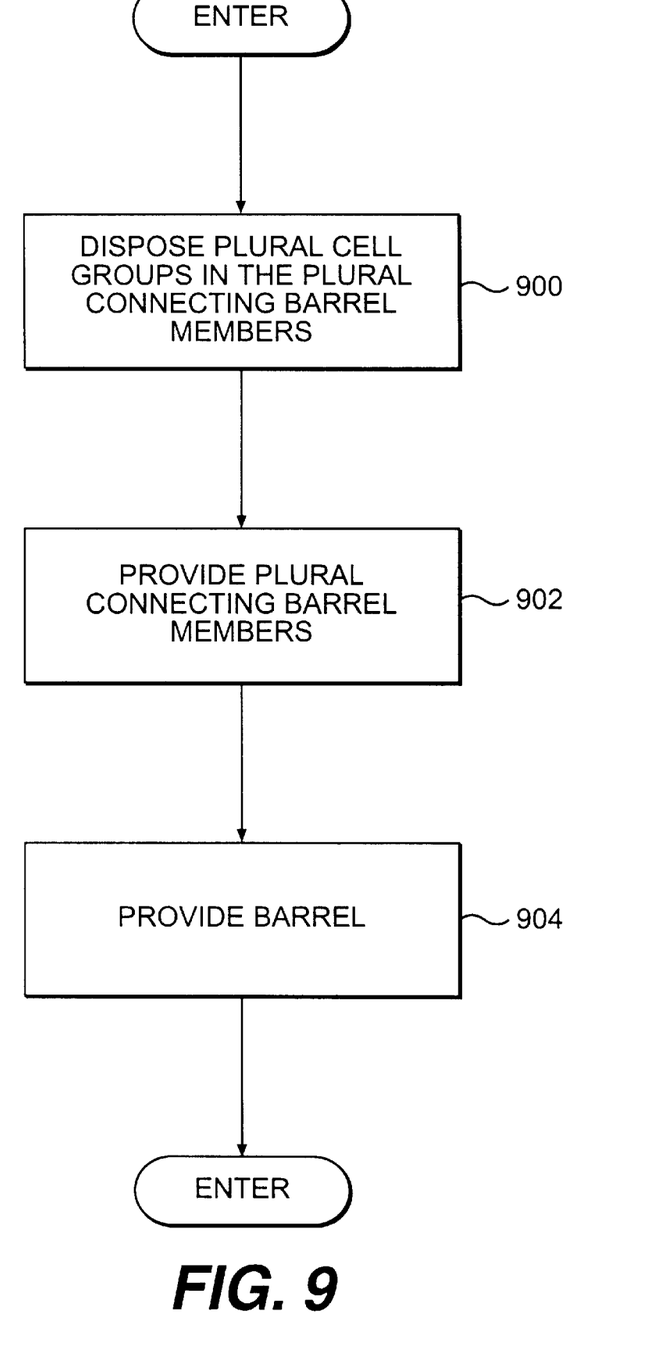
FIG. 9 is a flow chart showing a method of making a hybrid lens barrel consistent with the invention.

FIG. 9 is a flow chart showing a method of making a hybrid lens barrel consistent with the invention described herein. A plurality of cell groups are disposed in series along an optical axis, each cell group including at least a cell unit and each cell unit including a lens and a cell holding the lens (step 900), providing a plurality of connecting barrel members carrying the plurality of cell groups (step 902), and providing a barrel within which the plurality of cell groups may be slidably disposed (step 904). The connecting barrel member may be made of a material with a CTE<3.0 ppm/K. For example, the material may be made of a material such as Ultra Low Expansion™ glass, Zerodur glass, silicon carbide, or Invar. Step 904 may include, in a second embodiment as described above, making the barrel out of plural sub-barrels.

The flow chart may be modified in any manner consistent with the description of particular elements, materials and acts described herein. Other steps may be added to the flow chart of FIG. 9 without departing from the scope of the invention described herein. Moreover, the order of steps shown in FIG. 9 need not be performed in the order shown. That is, a hybrid lens barrel consistent with the invention may be made without following the exact ordering of steps as shown in FIG. 9. Methods of making a hybrid lens barrel consistent with the hybrid lens barrel disclosed herein are only limited by the elements and acts disclosed herein, and equivalents thereof.

Figure 10:
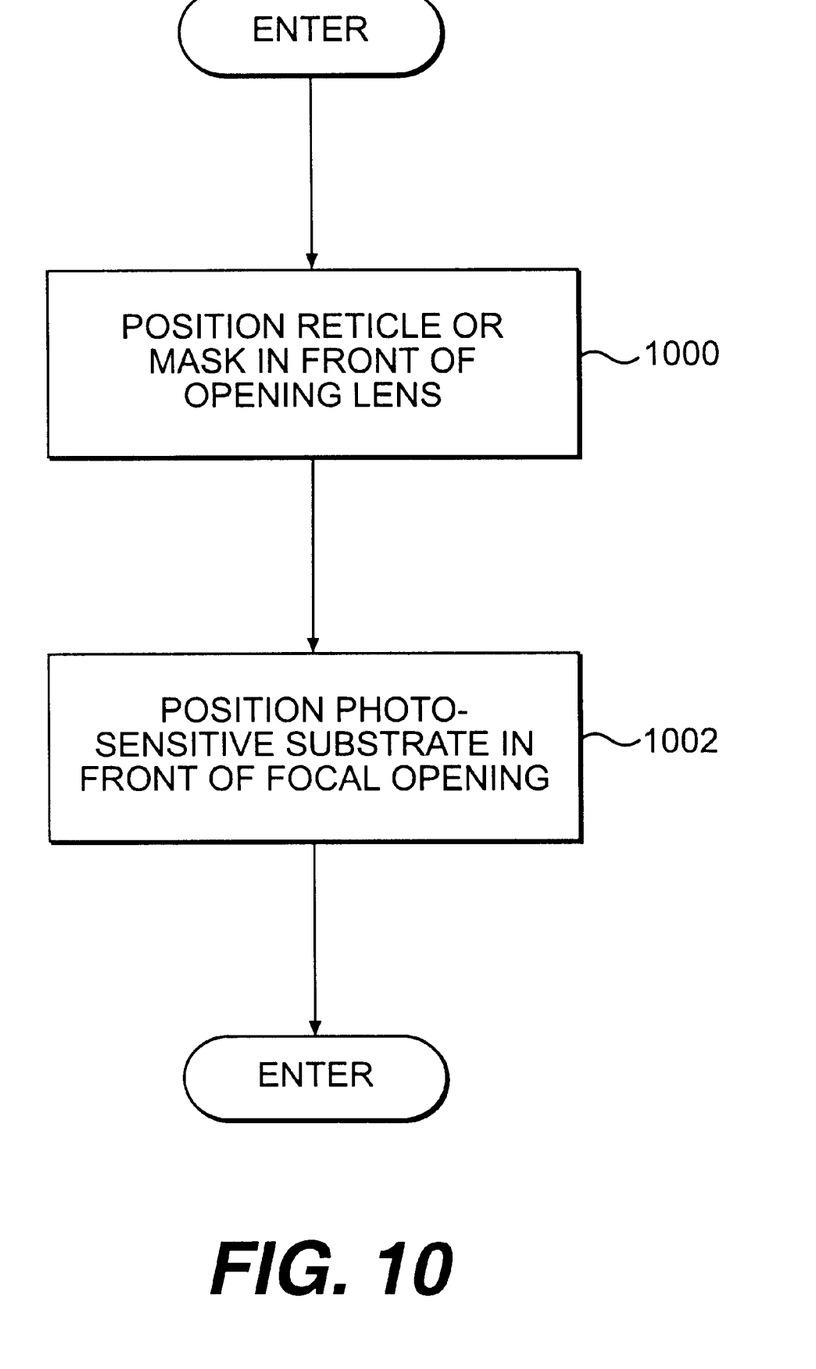
FIG. 10 is a flow chart showing a method of using a hybrid lens barrel consistent with the invention.

FIG. 10 is a flow chart showing a method of using the hybrid lens barrel. A template, such as a reticle or a mask, is positioned in front of opening lens, 112 or 212 (step 1000).

A photo-sensitive substrate is then positioned in front of the focal plane opening, 114 or 214 (step 1002). For example, hybrid optical barrel, 100 or 200, may be used in an optical projection unit of an optical projection unit for semiconductor manufacturing. The projection exposure unit reduces a pattern on the template through the optical projection unit, and sequentially transfers the pattern onto a predetermined area on a semiconductor wafer or plate which is a photo-sensitive substrate for making computer chips.

It will be apparent to those skilled in the art that various modifications and variations can be made in the optical barrel designed and the material chosen for the present invention and in construction of the sub-barrels and the lens holders as well as other aspects of the invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

I claim:

1. A hybrid optical barrel as an optical projection unit, the optical barrel comprising:

a plurality of cell groups disposed in series along an optical axis, each cell group including at least a cell unit and each cell unit including a lens and a cell holding the lens; and a plurality of connecting barrel members carrying the plurality of cell groups, the connecting barrel members made of a material with a CTE<3.0 ppm/K.

2. The hybrid optical barrel of claim 1, wherein the material is one of Ultra Low Expansion™ glass, Zerodur glass, silicon carbide, and Invar.

3. The hybrid optical barrel of claim 1, wherein each cell group further comprises a sub-cell disposed between the cell group and a connecting barrel member to connect the cell group.

4. The hybrid optical barrel of claim 3, wherein the sub-cell has a reference plane perpendicular to the optical axis and traversing an axial geometrical center of the sub-cell.

5. The hybrid optical barrel of claim 4, wherein the connecting barrel member comprises a plurality of sub-barrels disposed in series along the optical axis, each sub-barrel having a connection end and a receiving end, the connection end provided for connection with the receiving end of another consecutive sub-barrel.

6. The hybrid optical barrel of claim 5, wherein the reference plane of each sub-cell is aligned with the connection end of the sub-barrel such that, during an axial displacement of the sub-barrels caused by a temperature change, relative axial positions of the sub-cells remain substantially constant, thereby reducing an overall displacement of the lenses within the plurality of cell groups.

7. The hybrid optical barrel of claim 6, wherein the sub-cell includes a circumferential tongue abutting the reference plane and the sub-barrel includes a circumferential groove near the connection end to connectably receive the circumferential tongue.

8. The hybrid optical barrel of claim 5, wherein the sub-barrels comprise bent portions to accommodate the lenses of different sizes.

9. The hybrid optical barrel of claim 1, wherein the cell is made of brass.

10. The hybrid optical barrel of claim 1, wherein the cell is made of stainless steel.

11. The hybrid optical barrel of claim 3, wherein the sub-cell is made of brass.

12. The hybrid optical barrel of claim 3, wherein the sub-cell is made of Invar.

13. The hybrid optical barrel of claim 3, wherein the sub-cell is made of stainless steel.

14. A hybrid optical barrel for attachment to an optical projection unit, the optical barrel comprising:

a plurality of cell groups disposed in series along an optical axis, each cell group including at least a cell unit and each cell unit including a lens and a cell holding the lens;

a connecting barrel member carrying the plurality of cell groups, the connecting barrel member made of a material with a CTE<3.0 ppm/K; and a barrel disposed along the optical axis within which the connecting barrel member and the plurality of cell groups are slidably arranged.

15. The hybrid optical barrel of claim 14, wherein the material is one of Ultra Low Expansion™ glass, Zerodur glass, silicon carbide, and Invar.

16. The hybrid optical barrel of claim 14, wherein the connecting barrel member comprises a plurality of spacing members, each spacing member and a cell unit being alternately disposed such that, during an axial displacement of the optical barrel caused by a temperature change, relative axial dimensions of the spacing members remain substantially constant, thereby reducing an overall displacement of the lenses within the plurality of cell groups.

17. The hybrid optical barrel of claim 14, wherein the barrel is made of brass.

18. The hybrid optical barrel of claim 14, wherein the barrel is made of stainless steel.

19. The hybrid optical barrel of claim 14, wherein the barrel is made of Invar.

20. A hybrid optical barrel as an optical projection unit, the optical barrel comprising:

a plurality of sub-barrels, made of a material with a CTE<3.0 ppm°C., the sub-barrels serially connected along an optical axis to construct a barrel, each sub-barrel having a connection end, a receiving end, and a circumferential recess, the connection end provided for connection with the receiving end of another consecutive sub-barrel;

a plurality of cell groups, each cell group comprising at least a cell unit and each cell unit including a lens and cell holding the lens; and a plurality of sub-cells, each sub-cell carrying one of the plurality of cell groups and disposed inside one of the plurality of sub-barrels, each sub-cell having a reference surface perpendicular to the optical axis and traversing an axial center of the sub-cell so that the reference surface remains aligned with the respective circumferential recess of the corresponding sub-barrel such that during an axial displacement of one of the sub-barrels, relative axial displacements of the sub-cells minimize an overall axial displacement of the lenses.

21. The hybrid optical barrel of claim 20, wherein the material is one of Ultra Low Expansion™ glass, Zerodur glass, silicon carbide, and Invar.

22. The hybrid optical barrel of claim 20, wherein the sub-barrels comprise bent portions to accommodate the lenses of different sizes.

23. The hybrid optical barrel of claim 20, wherein the sub-cells are made of brass.

24. The hybrid optical barrel of claim 20, wherein the sub-cells are made of Invar.

25. The hybrid optical barrel of claim 20, wherein the sub-cells arc made of stainless steel.

26. A hybrid optical barrel as an optical projection unit, the optical barrel comprising:
   a plurality of cell groups, each cell group comprising at least a cell unit and each cell unit including a lens and cell holding the lens; and
   a plurality of spacing members, made of a material selected with a CTE<3.0 ppm°C.; and
   a barrel disposed along the optical axis within which the spacing members and the cell units being slidably and alternatingly disposed so that during an axial displacement of the optical barrel caused by a temperature change, relative axial displacements of the spacing members minimize an overall axial displacement of the lenses.

27. The hybrid optical barrel of claim 26 wherein the material is one of Ultra Low Expansion™ glass, Zerodur glass, silicon carbide, and Invar.

28. The hybrid optical barrel of claim 26, wherein the barrel is made of brass.

29. The hybrid optical barrel of claim 26, wherein the barrel is made of stainless steel.

30. The hybrid optical barrel of claim 26, wherein the barrel is made of Invar.

31. A method of making a hybrid optical barrel comprising:
   disposing a plurality of cell groups in series along an optical axis, each cell group including at least a cell unit and each cell unit including a lens and a cell holding the lens; and
   carrying the plurality of cell groups using a plurality of connecting barrel members, the connecting barrel members made of a material with a CTE<3.0 ppm/K.

32. The method according to claim 31, wherein the material is one of Ultra Low Expansion™ glass, Zerodur glass, silicon carbide, and Invar.

33. A method of making a hybrid optical barrel for attachment to an optical projection unit, comprising:
   disposing a plurality of cell groups in series along an optical axis, each cell group including at least a cell unit and each cell unit including a lens and a cell holding the lens;
   carrying the plurality of cell groups using a connecting barrel member, the connecting barrel member made of a material with a CTE<3.0 ppm/K; and
   disposing a barrel along the optical axis such that the connecting barrel member and the plurality of cell groups are slidably arranged within the barrel.

34. The method according to claim 33, wherein the material is one of Ultra Low Expansion™ glass, Zerodur glass, silicon carbide, and Invar.

35. A method of making a hybrid optical barrel comprising:
   serially connecting a plurality of sub-barrels, made of a material with a CTE<3.0 ppm°C., along an optical axis to construct a barrel, each sub-barrel having a connection end, a receiving end, and a circumferential recess, the connection end provided for connection with the receiving end of another consecutive sub-barrel;
   providing a plurality of cell groups, each cell group comprising at least a cell unit and each cell unit including a lens and cell holding the lens; and
   in a respective sub-cell, carrying each cell group and each sub-cell disposed inside one of the plurality of sub-barrels, each sub-cell having a reference surface perpendicular to the optical axis and traversing an axial center of the sub-cell so that the reference surface remains aligned with the respective circumferential recess of the corresponding sub-barrel such that during an axial displacement of one of the sub-barrels, relative axial displacements of the sub-cells minimize an overall axial displacement of the lenses.

36. The method according to claim 35, wherein the material is one of Ultra Low Expansion™ glass, Zerodur glass, silicon carbide, and Invar.

37. A method of making a hybrid optical barrel comprising:
   providing a plurality of cell groups, each cell group comprising at least a cell unit and each cell unit including a lens and cell holding the lens;
   providing a plurality of spacing members, made of a material with a CTE<3.0 ppm/K; and
   disposing a barrel along the optical axis within which the spacing members and the cell units being slidably and alternatingly disposed so that during an axial displacement of the optical barrel caused by a temperature change, relative axial displacements of the spacing members minimize an overall axial displacement of the lenses.

38. The method according to claim 37, wherein the material is one of Ultra Low Expansion™ glass, Zerodur glass, silicon carbide, and Invar.

39. A method of using a hybrid optical barrel, comprising:
   positioning a template in line with an optical axis at one end of a hybrid optical barrel, said hybrid optical barrel including:
      a plurality of cell groups disposed in series along an optical axis, each cell group including at least a cell unit and each cell unit including a lens and a cell holding the lens; and
      a plurality of connecting barrel member carrying the plurality of cell groups, the connecting barrel member made of a material with a CTE<3.0 ppm/K; and
   positioning a photosensitive substrate in line with the optical axis at the other end of the hybrid optical barrel.

40. The method according to claim 39, wherein the material is one of Ultra Low Expansion™ glass, Zerodur glass, silicon carbide, and Invar.

41. A method of using a hybrid optical barrel for attachment to a optical projection unit, comprising:
   positioning a template in line with an optical axis at one end of a hybrid optical barrel, said hybrid optical barrel including:
      a plurality of cell groups disposed in series along an optical axis, each cell group including at least a cell unit and each cell unit including a lens and a cell holding the lens;
      a connecting barrel member carrying the plurality of cell groups, the connecting barrel member made of a material with a CTE<3.0 ppm/K; and
      a barrel disposed along the optical axis within which the connecting barrel member and the plurality of cell groups are slidably arranged; and
   positioning a photosensitive substrate in line with the optical axis at the other end of the hybrid optical barrel.

42. The method according to claim 41, wherein the material is one of Ultra Low Expansion™ glass, Zerodur glass, silicon carbide, and Invar.

43. A method of using a hybrid optical barrel comprising:

positioning a template in line with an optical axis at one end of a hybrid optical barrel, said hybrid optical barrel including:
- a plurality of sub-barrels, made of a material with a CTE<3.0 ppm°C. such as Ultra Low Expansion™ glass, Zerodur glass, or silicon carbide, the sub-barrels serially connected along an optical axis to construct a barrel, each sub-barrel having a connection end, a receiving end, and a circumferential recess, the connection end provided for connection with the receiving end of another consecutive sub-barrel;
- a plurality of cell groups, each cell group comprising at least a cell unit and each cell unit including a lens and cell holding the lens;
- a plurality of sub-cells, each sub-cell carrying one of the plurality of cell groups and disposed inside one of the plurality of sub-barrels, each sub-cell having a reference surface perpendicular to the optical axis and traversing an axial center of the sub-cell so that the reference surface remains aligned with the respective circumferential recess of the corresponding sub-barrel such that during an axial displacement of one of the sub-barrels, relative axial displacements of the sub-cells minimize an overall axial displacement of the lenses; and positioning a photosensitive substrate in line with the optical axis at the other end of the hybrid optical barrel.

44. The method according to claim 41, wherein the material is one of Ultra Low Expansion™ glass, Zerodur glass, silicon carbide, and Invar.

45. A method of using a hybrid optical barrel comprising:

positioning a template in line with an optical axis at one end of a hybrid optical barrel, said hybrid optical barrel including:
- a plurality of cell groups, each cell group comprising at least a cell unit and each cell unit including a lens and cell holding the lens;
- a plurality of spacing members, made of a material with a CTE<3.0 ppm/K; and
- a barrel disposed along the optical axis within which the spacing members and the cell units being slidably and alternatingly disposed so that during an axial displacement of the optical barrel caused by a temperature change, relative axial displacements of the spacing members minimize an overall axial displacement of the lenses; and positioning a photosensitive substrate in line with the optical axis at the other end of the hybrid optical barrel.

46. The method according to claim 45, wherein the material is one of Ultra Low Expansion™ glass, Zerodur glass, silicon carbide, and Invar.

* * * * *

UNITED STATES PATENT AND TRADEMARK OFFICE
CERTIFICATE OF CORRECTION

PATENT NO. : 6,118,599

DATED: September 12, 2000

INVENTOR: Marc SPINALI

It is hereby certified that errors appear in the above-identified patent and that said Letters Patent is hereby corrected as shown below:

Title Page, Item [57], in the Abstract, line 7, "3.0 ppm°C" should read --3.0 ppm/°C--.

Claim 20, col. 8, line 40, "3.0 ppm°C" should read --3.0 ppm/°C--.

Claim 25, col. 9, line 4, "arc made" should read --are made--.

Claim 26, col. 9, line 11, "3.0 ppm°C" should read --3.0 ppm/°C--.

Claim 35, col. 9, line 60, "3.0 ppm°C" should read --3.0 ppm/°C--.

Claim 41, col. 10, line 49, "a optical" should --an optical--.

Claim 43, col. 11, line 6, "3.0 ppm°C" should read --3.0 ppm/°C--.

Signed and Sealed this

Twenty-ninth Day of May, 2001

*Attest:*

NICHOLAS P. GODICI

*Attesting Officer*     *Acting Director of the United States Patent and Trademark Office*